United States Patent Office 2,785,204
Patented Mar. 12, 1957

2,785,204

SULFONIUM COMPOUNDS

Martin J. Weiss, Highland Park, N. J., assignor to American Cyanamid Company, New York, N. Y., a corporation of Maine No Drawing. Application April 2, 1954,
Serial No. 420,745

8 Claims. (Cl. 260—607)

This invention relates to new organic compounds. More particularly, it relates to gamma-hydroxypropyl sulfonium salts.

The new compounds of the present invention may be illustrated by the following general formula:

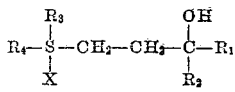

in which $R_1$ is a monocyclic radical, $R_2$ is a member of the group consisting of cycloalkyl, alkyl, monocyclic aryl and aralkyl radicals, $R_3$ is an alkyl radical, $R_4$ is a member of the group consisting of alkyl, aralkyl, alkenyl, alkynyl and phenacyl radicals and $X$ is a halogen radical. These sulfonium salts are white, generally water-soluble crystalline solids.

The compounds of the present invention can be prepared by several methods, however, we prefer to use the method illustrated by the following series of reactions:

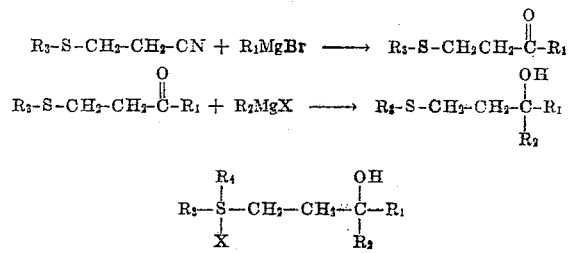

The β-alkylmercaptopropionitriles used in the synthesis of the present compounds are known and can be prepared by the reaction of alkyl mercaptans with acrylonitrile in the presence of a basic catalyst as described in the chemical literature. The beta-alkylmercaptopropiophenones are prepared from these nitriles by reaction with an appropriate Grignard reagent. The magnesium halide salt of the resulting imine may be hydrolyzed to the desired ketone with dilute aqueous mineral acid solution. Reaction of the beta-alkylmercaptopropiophenones with the appropriate Grignard reagent yields the corresponding beta-alkylmercaptoethyl tertiary carbinol. The carbinol can be liberated from its magnesium halide salt by treatment with aqueous ammonium chloride solution.

The sulfonium salts are prepared by treating the appropriate thio ether with alkyl, aralkyl, phenacyl, alkenyl or alkynyl halides. This preparation is carried out at room temperature usually in the presence of an excess of the halides in solvents such as acetone or ether. It may, however, be carried out without added solvents. The sulfonium salt will usually precipitate as a crystalline solid. The reaction usually proceeds rapidly in the case of reactive halides such as methyl iodide, allyl iodide, propargyl iodide, or benzyl bromide and in these instances is essentially complete within 24 hours. With the less reactive halides, the reaction may take longer for completion.

The compounds of the present invention possess antispasmodic and anti-gastric secretory properties and are useful for these purposes.

The following examples show in detail the preparation of representative compounds of the present invention.

EXAMPLE 1

A solution of beta-methylmercaptopropionitrile (101 parts) in 300 parts of anhydrous ether is added dropwise to a stirred solution of phenylmagnesium bromide, prepared from bromobenzene (197 parts) and magnesium (28 parts) in 350 parts of anhydrous ether. A solid precipitates as the nitrile is added. After the addition is completed (one hour), 210 parts of ether is added and the suspension is stirred for 18 hours. A cold solution of 275 parts of concentrated hydrochloric acid solution in 350 parts of water is then added dropwise. Much heat is evolved and the ether is allowed to boil out. The two liquid phases are stirred and warmed on the steam bath for one hour and are then cooled and extracted several times with ether. A considerable quantity of ether-insoluble gums are present. After drying the combined ether extracts over anhydrous sodium sulfate, the solvent is stripped and the residual oil is distilled under reduced pressure. Following a short forerun, beta-methylmercaptopropiophenone is collected as a colorless oil boiling at 112°–117° C. at 1.6 mm. The yield is 93 parts (53%). Redistillation gives material boiling at 110°–115° C. at 1.1 mm ($n^{29°}$:1.5687).

A solution of beta-methylmercaptopropiophenone (60 parts) in 140 parts of anhydrous ether is added dropwise to a stirred solution of cyclohexylmagnesium bromide prepared in the usual manner from cyclohexyl bromide (65 parts) and magnesium (9.3 parts) in 300 parts of anhydrous ether. Heat is evolved and the rate of addition is adjusted so that the ether refluxes gently. Within a few minutes a gray solid begins to precipitate. Addition is complete in 70 minutes; stirring is then continued for 18 hours. A solution of ammonium chloride (45 parts) in 150 parts of water is then added (heat is evolved). The ether phase is separated and is combined with an ether extract of the aqueous phase. After drying the combined ether solutions over anhydrous sodium sulfate, solvent is stripped and the residual oil is distilled under reduced pressure to give after a considerable forerun 28 parts (32%) of 1-cyclohexyl-3-methylmercapto-1-phenyl-propan-1-ol boiling at 156°–165° C. at 1.2 mm. Redistillation of a sample gives material boiling at 150° C. at 0.9 mm.

1-cyclohexyl-3-methylmercapto-1-phenylpropan-1-ol (40 parts) is dissolved in 228 parts of methyl iodide. Within a short time, crystals begin to form. After sitting at room temperature for 24 hours, the massive precipitation of brownish colored product is filtered and washed with acetone and ether and air dried. The acetone wash very effectively removes the color. The yield of (3-cyclohexyl-3-hydroxy-3-phenylpropyl)dimethylsulfonium iodide, melting at 134°–139° C. with gas evolution, is 48 parts (77%). A recrystallization from about 68 parts of ethanol gives white crystals (42 parts) melting at 138°–140° C.

EXAMPLE 2

By following the general outlines of the procedure of Example 1 with substitution of the appropriate gamma-hydroxypropyl sulfide and halide the products of the table were obtained. In certain instances acetone or ether were used as reaction solvents. The less reactive halides or sulfides required considerably longer reaction periods than the approximate twenty-four hours of Example 1. In two instances only a slight or no excess of the halide was used. These changes are indicated in the table.

Table

| Product | Halide | Solvent | M. P., ° C. |
|---|---|---|---|
| 1. (3-Cyclohexyl-3-hydroxy-3-phenylpropyl)ethyl-methyl sulfonium iodide. | methyl iodide (several weeks). | none | 116.5 |
| 2. Allyl(3-cyclohexyl-3-hydroxy-3-phenylpropyl)-methyl sulfonium iodide. | allyl iodide | ether | 106.5–107.5 |
| 3. (3-Cyclohexyl-3-hydroxy-3-phenylpropyl)methylpropargyl sulfonium bromide. | propargyl bromide (slight excess). | acetone | 141.5 |
| 4. Benzyl(3-cyclohexyl-3-hydroxy-3-phenylpropyl)-methyl sulfonium bromide. | benzyl bromide | do | 105–106 |
| 5. (3-Cyclohexyl-3-hydroxy-phenylpropyl)-diethyl sulfonium iodide. | ethyl iodide (several weeks). | ether | 112–113 |
| 6. p-Chlorophenacyl(3-cyclohexyl-3-hydroxy-3-phenyl-propyl)methyl sulfonium bromide. | p-chlorophenacyl bromide (10% excess). | methanol | 127–128 |

EXAMPLE 3

Iso-propylmagnesium iodide in ether solution is prepared in the usual way from magnesium (6.1 parts) and iso-propyl iodide (42.4 parts). To this solution is added with stirring β-methylmercaptopropiophenone (45 parts) in 210 parts of ether and stirring is continued overnight at room temperature.

Ammonium chloride (30 parts), dissolved in 1000 parts of water, is added and stirring is continued for three hours under reflux. The ether solution is separated from the aqueous phase, washed several times with water and dried over anhydrous sodium sulfate. The solvent ether is distilled to leave a yellow colored oil, which on distillation under reduced pressure gives after a short forerun, a product (31.4 g.), boiling at 125°–135° C., at 0.6 mm., which is 2-methyl-5-methylmercapto-3-phenylpentan-3-ol contaminated with unreacted ketone. The contaminant is removed by the following procedure:

A solution of the impure carbinol (10 parts) in methanol (32 parts) is mixed with a solution of 6.8 parts of semicarbazide.HCl and 8.2 parts of sodium acetate.3H₂O (8.2 g.) in 20 parts of water. After heating under reflux for two and one-half hours, the solvent is distilled at aspirator pressure. Water is added and the mixture is extracted with ether. The combined ether extracts are washed with water and dried over anhydrous calcium sulfate. Considerable quantities of beta-methylmercaptopropiophenone semicarbazone as water and ether insoluble hard granular grey crystals are separated by filtration. After filtering the calcium sulfate, the etheral solution of the carbinol is used directly for the preparation of the sulfonium salt.

Methyl iodide (18 parts) is added to this ether solution. After standing overnight at room temperature a yellow solid is obtained. Repeated recrystallizations from alcohol yields (3-hydroxy-2-methyl-3-phenylpentyl)dimethyl sulfonium iodide as white crystals melting at 123°–126° C.

EXAMPLE 4

Phenylmagnesium bromide in ether solution is prepared in the usual way from magnesium (4.1 parts) and bromobenzene (26.2 parts). To the stirred solution is added β-methylmercaptopropiophenone (30 parts) in 70 parts of ether and the solution stirred at room temperature overnight. Ammonium chloride (25 parts) dissolved in 250 parts of water, is added and stirring is continued for three hours under reflux. The ether solution is separated from the aqueous phase, washed several times with water and dried over anhydrous sodium sulfate. The solvent ether is removed by distillation to leave 1,1-diphenyl-3-methylmercaptopropan-1-ol, 38 parts (84%) as a white crystalline product melting at 108° C. Repeated recrystallization from absolute alcohol yields product melting at 109° C.

1,1-diphenyl-3-methylmercaptopropan-1-ol (7 parts) is dissolved in the minimum amount of anhydrous acetone and methyl iodide (23 parts) is added. The solution is allowed to stand in the dark at room temperature overnight. The precipitated product is filtered, washed with anhydrous ether and air dried to give dimethyl(3,3-diphenyl-3-hydroxypropyl) sulfonium iodide (11.3 parts) as white crystals melting at 135° C. with decomposition. Recrystallization from absolute methanol gives 8.8 parts (81%) melting at 138.5° C. with decomposition.

EXAMPLE 5

Benzylmagnesium bromide is prepared in ether solution from magnesium (4.4 parts) and freshly distilled benzyl bromide (30.9 parts). To this rapidly stirred solution is added β-ethylmercaptopropiophenone (35 parts) dissolved in 350 parts of anhydrous ether, and stirring is continued overnight at room temperature.

Ammonium chloride (22 parts) dissolved in 500 parts of water, is added and stirring is continued for two hours under reflux. The ether solution is separated from the aqueous phase, washed several times with water and dried over anhydrous sodium sulfate. Upon distillation of the solvent, there remains a yellow colored oil (44 parts) which on distillation gives, after a considerable forerun, 1,2-diphenyl-4-ethylmercaptobutan-2-ol (16 parts) collected at 170°–200° C. at 1 mm. On standing for several days at room temperature the product crystallizes to a low melting solid. Redistillation of the crude product gives material boiling at 157°–158° C. at 0.3 mm.

1,2-diphenyl-4-ethylmercaptobutan-2-ol (5 parts) is dissolved in methyl iodide (46 parts) and the solution allowed to stand overnight in the dark at room temperature. The material which separates as white crystals is washed with anhydrous ether and air dried. The product is dissolved in the minimum amount of absolute methanol, filtered and reprecipitated with excess anhydrous ether to yield ethyl(3,4-diphenyl-3-hydroxybutyl)methyl sulfonium iodide (5.3 parts) melting at 115.5° C. with decomposition.

I claim:

1. A compound having the formula

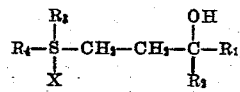

in which $R_1$ is a phenyl radical, $R_2$ is a member of the group consisting of cyclohexyl, lower alkyl, phenyl, and benzyl radicals, $R_3$ is a lower alkyl radical, $R_4$ is a member of the group consisting of lower alkyl, benzyl, propargyl, allyl, and para-chlorophenacyl radicals, and X is a halogen of the group consisting of bromine and iodine atoms.

2. An unsubstituted allyl(3-cyclohexyl-3-hydroxy-3-phenylpropyl)lower alkyl sulfonium iodide.

3. An unsubstituted (3-cyclohexyl-3-hydroxy-3-phenylpropyl)dilower alkyl sulfonium iodide.

4. (3-cyclohexyl-3-hydroxy-3-phenylpropyl)dimethyl sulfonium iodide.
5. Allyl(3-cyclohexyl-3-hydroxy-3-phenylpropyl)methyl sulfonium iodide.
6. (3-cyclohexyl-3-hydroxy-3-phenylpropyl) diethyl sulfonium iodide.
7. (3-cyclohexyl-3-hydroxy-3-phenylpropyl) methylpropargyl sulfonium bromide.
8. (3-cyclohexyl-3-hydroxy-3-phenylpropyl) ethyl methyl sulfonium iodide.

References Cited in the file of this patent

Exner et al.: Chem. Listy (Czech.), vol. 46, pages 344–346 (1952); also Chem. Abstracts, vol. 47, page 4299f.

Exner et al.: Collection Czech. Chem. Communication (1953), vol. 18, pages 270–274; also Chem. Abstracts, vol. 47, page 9928e.